(12) United States Patent
No et al.

(10) Patent No.: US 12,140,921 B2
(45) Date of Patent: Nov. 12, 2024

(54) APPARATUS AND METHOD FOR SETTING CONTROLLER BOARD ID OF HVDC SYSTEM

(71) Applicant: HYOSUNG HEAVY INDUSTRIES CORPORATION, Seoul (KR)

(72) Inventors: Jae Keun No, Seoul (KR); Sung Min Oh, Seoul (KR); Chang Hwan Yang, Seoul (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 472 days.

(21) Appl. No.: 17/623,120

(22) PCT Filed: Dec. 30, 2020

(86) PCT No.: PCT/KR2020/019383
§ 371 (c)(1),
(2) Date: Dec. 27, 2021

(87) PCT Pub. No.: WO2021/157864
PCT Pub. Date: Aug. 12, 2021

(65) Prior Publication Data
US 2022/0229410 A1    Jul. 21, 2022

(30) Foreign Application Priority Data

Feb. 4, 2020 (KR) .................. 10-2020-0013201

(51) Int. Cl.
*G05B 19/042* (2006.01)
(52) U.S. Cl.
CPC .......... *G05B 19/0423* (2013.01); *G05B 2219/21012* (2013.01)

(58) Field of Classification Search
CPC .................................................. G05B 19/0423
USPC ........................................................... 700/286
See application file for complete search history.

(56) References Cited

U.S. PATENT DOCUMENTS

| 8,862,278 B2* | 10/2014 | Lin ............... G06F 1/206 700/286 |
| 2002/0188786 A1* | 12/2002 | Barrow ............. G06F 13/38 710/300 |
| 2003/0188067 A1 | 10/2003 | Okin |
| 2005/0018709 A1* | 1/2005 | Barrow ............. G06F 3/0605 370/465 |

(Continued)

FOREIGN PATENT DOCUMENTS

| KR | 10-2014-0016455 A | 2/2014 | |
| KR | 20140016455 A * | 2/2014 | ............. G06F 1/185 |

(Continued)

*Primary Examiner* — Mohammad Ali
*Assistant Examiner* — Joshua T Sanders
(74) *Attorney, Agent, or Firm* — NKL Law; Jae Youn Kim (57) ABSTRACT

The present invention relates to an apparatus and a method for setting up a board ID of a board used for a controller in a HVDC system that is capable of shortening inspection time of a board by easily identifying a location and a type of the board for inspection mounted. The apparatus for setting up a board ID of a board used for a controller in a HVDC system in the present invention comprises: IO boards for controlling submodules; a main board for managing the at least one IO board, and a backplane for connecting the main board with the at least one IO board.

6 Claims, 5 Drawing Sheets

(56) References Cited

U.S. PATENT DOCUMENTS

2014/0268468 A1* 9/2014 Sheng .................... H01J 17/12
  361/115
2020/0305945 A1* 10/2020 Morgan ................ A61B 18/00

FOREIGN PATENT DOCUMENTS

| KR | 10-2015-0000932 A | 1/2015 |
| KR | 10-2017-0099270 A | 8/2017 |
| KR | 10-1769708 B1 | 8/2017 |
| WO | 2012122689 A1 | 9/2012 |
| WO | 2020/014952 A1 | 1/2020 |

* cited by examiner

| Board Type \ SLOT | | 1 | 2 | 3 | 4 | 5 | 6 |
|---|---|---|---|---|---|---|---|
| AI16 | 1 | 11 | 12 | 13 | 14 | 15 | 16 |
| AO16 | 2 | 21 | 22 | 23 | 24 | 25 | 26 |
| AI08_AO08 | 3 | 31 | 32 | 33 | 34 | 35 | 36 |
| DI16 | 4 | 41 | 42 | 43 | 44 | 45 | 46 |
| DO18 | 5 | 51 | 52 | 53 | 54 | 55 | 56 |
| DI08_DO08 | 6 | 61 | 62 | 63 | 64 | 65 | 66 |

APPARATUS AND METHOD FOR SETTING CONTROLLER BOARD ID OF HVDC SYSTEM

FIELD OF THE INVENTION

The present invention relates to an apparatus and a method for setting up a board ID of a board used for a controller in a high-voltage direct current (HVDC) system, and more particularly to, the apparatus and the method for setting up the board ID of the board used for the controller in the HVDC system according to a location of each of boards mounted in a backplane. In other words, the present invention relates to the apparatus and the method of setting up the board ID of the board used for the controller in the HVDC system by combining a location of each of the boards mounted in the backplane with a unique ID thereof.

BACKGROUND OF THE INVENTION

Recently, to connect a power system; there has been an increasing interest in a method for connecting a power system by converting AC power to DC power rather than a method for connecting an AC power system. Even in Korea, a HVDC electric power transmission system using a power converter has been installed between Jeju and Haenam to connect power systems in Jeju and Haenam.

This refers to a method of converting high voltage power generated from a power plant from AC power to DC power and transmitting the power, reconverting the power to AC power and supplying it to a desired power-receiving area, and this has an advantage of having transmission efficiency at least twice compared to the AC because the DC has less transmission power loss than the AC.

Meanwhile, the aforementioned HVDC may be configured by using multiple modular multilevel converters (MMCs) as DC-DC converters. A MMC is configured by connecting modular two-level or three-level converters with IGBT in small capacity in series. The control of such MMCs is required to be stably operated, and the studies on stabilization of the control of such MMCs have been continuously performed.

For an example, Korean Patent Laid-Open Patent No. 10-2014-0008586 suggested a configuration of: receiving a data back signal received through a communication part of a HVDC system, confirming any error in data or line connection based on the acquired data back signal, and outputting a valve control signal to a valve control apparatus based on the control of a control unit while making the control unit output a valve controlling signal based on the data back signal to be capable of controlling system and data flow stably.

However, in this case, as analysis is made simply based on a data back signal, it is impossible to consider a location of a control unit, and it may take a longer time to check the control unit because it is impossible to identify a type of the control unit.

DETAILED EXPLANATION OF THE INVENTION

Technical Problem

The object of the present invention is to provide an apparatus and a method for setting up a board ID of a board used for a controller in a HVDC system that is capable of easily identifying a location and a type of the board for inspection based on locations and types of boards mounted.

The other object of the present invention is to provide an apparatus and a method for setting up a board ID of a board used for a controller in a HVDC system that is capable of shortening a time for inspecting a board by easily identifying locations and types of boards mounted.

Means of Solving the Problem

An apparatus for setting up a board ID of a board used in a controller in a HVDC system in accordance with the present invention may include input/output (IO) boards for controlling submodules, a main board for managing at least one IO board, and a backplane for connecting the main board with the at least one IO board.

Herein, the at least one IO board may create its board ID based on its type and location mounted in the backplane, and deliver the board ID to the main board.

In addition, the apparatus for setting up a board ID of a board used in the controller in the HVDC system may further comprise a communication board for performing communication with the at least one IO board, and a power supply board for supplying power to the main board, the communication board and the IO boards.

Herein, the IO boards may be mounted in the backplane regardless of their types and order.

Besides, a board ID may be created by the at least one IO board according to its type and its location mounted in the backplane.

At the time, the IO board may read a board PIN value that represents its type and a slot PIN value that represents its location mounted in the backplane to create a board ID.

Meanwhile, the IO boards may include at least one of an analog input (AI) board, an analog output (AO) board, an AI/AO board, a digital input (DI) board, a digital output (DO) board, and a DI/DO board.

A method for setting up a board ID of a board used for a controller in accordance with another example embodiment of the present invention may comprise steps of: an IO board collecting slot PIN information and board PIN information by reading a board PIN value that represents its type and a slot PIN value that represents its location mounted in a backplane; the IO board creating its board ID based on the board PIN value and the slot PIN value; a main board determining board type and slot information with the board ID; and operating the board according to a result of determination with the board ID.

In addition, the step of operating the board may include steps of: operating an AI board if the board ID represents the AI board; operating an AO board if the board ID represents the AO board; operating an AI/AO board if the board ID represents the AI/AO board; operating a DI board if the board ID represents the DI board; operating a DO board if the board ID represents the DO board; and operating a DI/DO board if the board ID represents the DI/DO board.

Effects of the Invention

An apparatus and a method for setting up a board ID of a board used for a controller in a HVDC system in accordance with the present invention have an advantage of easily identifying a location and a type of a board for inspection based on locations and types of boards mounted in a backplane.

In addition, the apparatus and the method for setting up a board ID of a board used for the controller in the HVDC system in accordance with the present invention also have an advantage of shortening a time of inspecting a board by easily identifying locations and types of boards mounted in a backplane.

DETAILED DESCRIPTION OF THE PREFERRED EMBODIMENTS

Detailed example embodiments to implement the present invention will be explained below by referring to attached drawings.

The present invention may be altered in a variety of ways, and have several example embodiments. Specific example embodiments will be illustrated in drawings and detailed explanation will be made. This is not intended to limit the present invention in a specific embodiment, but it may be understood to include all alterations, equivalents and substitutes included in the thought and technical scope of the present invention.

Below will be detailed explanation on an apparatus and a method for setting up a board ID of a board used for a controller in a HVDC system in accordance with the present invention by referring to attached drawings.

Figure 1:
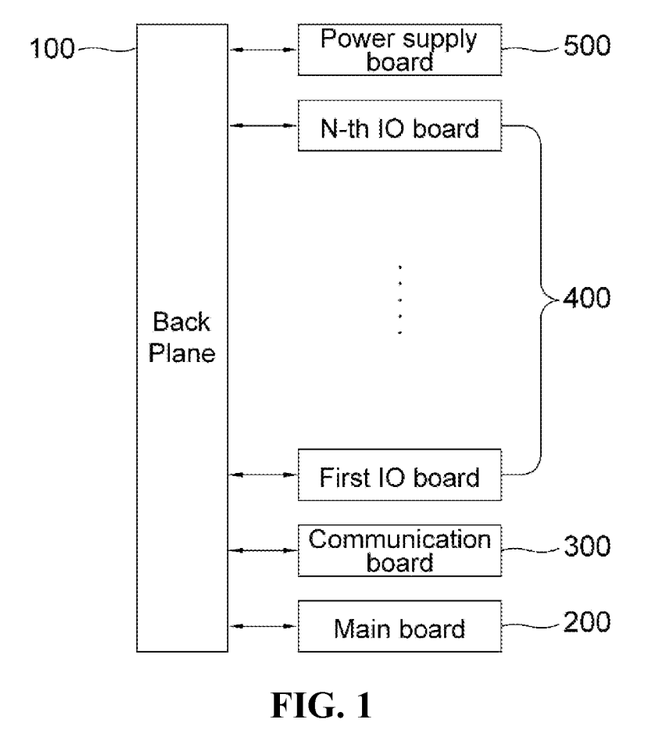
FIG. 1 is a block diagram representing an apparatus for setting up a board ID of a board used for a controller in a HVDC system in accordance with one example embodiment of the present invention.
Figure 2:
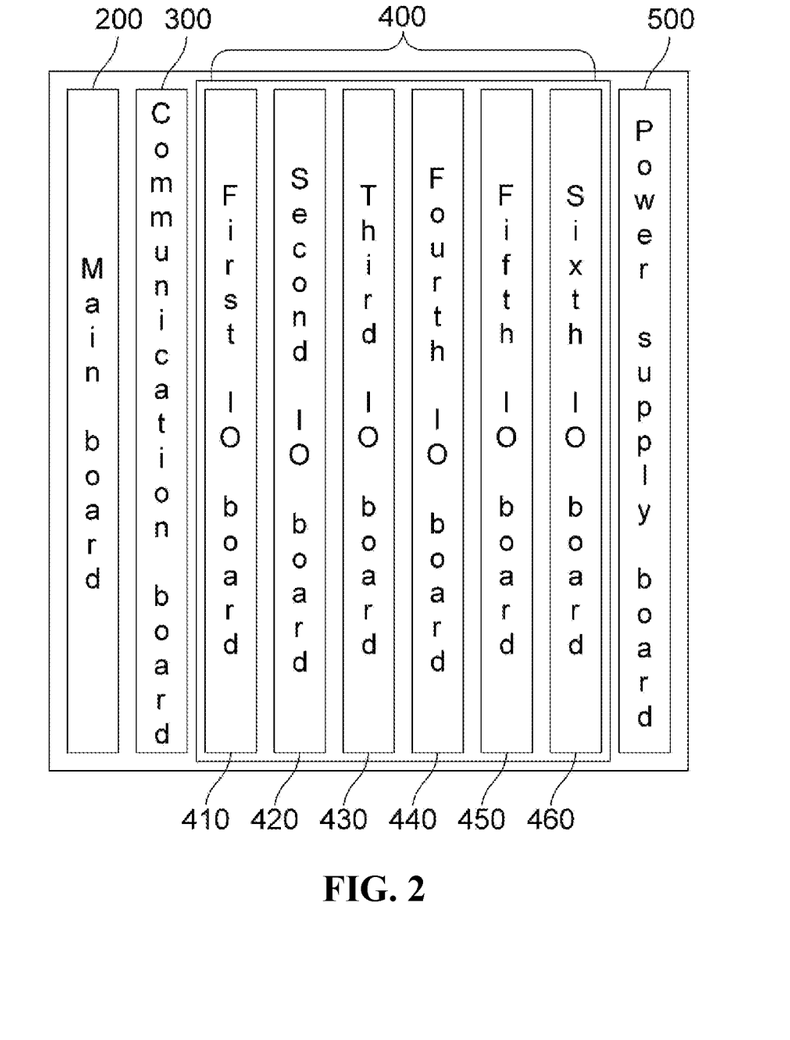
FIG. 2 is a drawing illustrating the front part of a backplane, in detail, where a main board, a communication board, IO boards and a power supply board are mounted as seen in FIG. 1.
Figure 3:
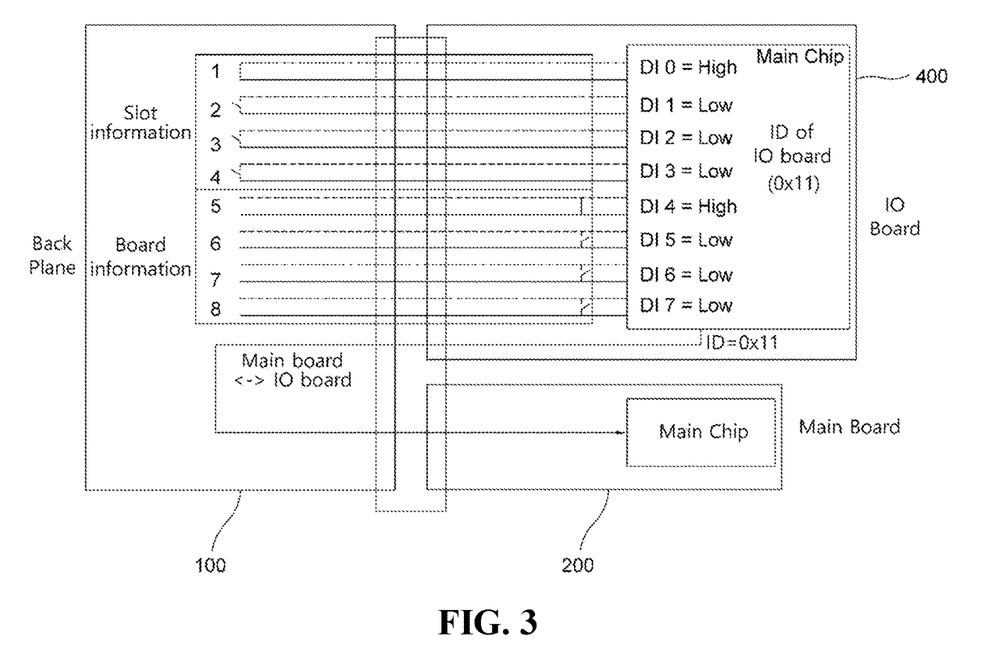
FIG. 3 is a signal connection diagram representing a connection line through which each of IO boards creates a board ID in FIG. 1.
Figure 4:
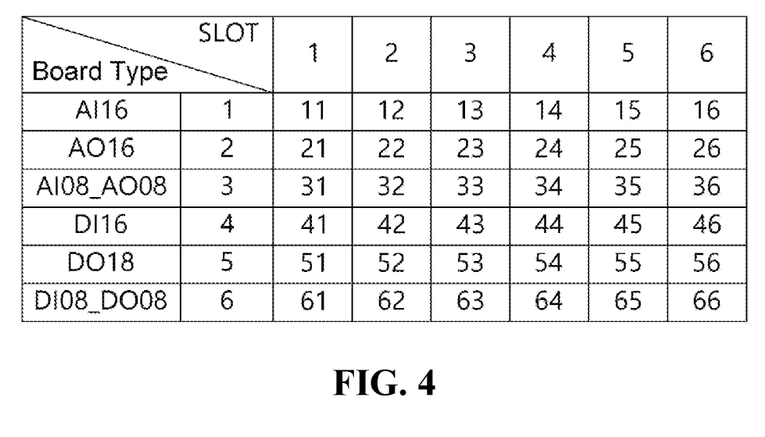
FIG. 4 is a table representing an example of each of IO boards creating a board ID in FIG. 1.

FIG. 1 is a block diagram representing an apparatus for setting up a board ID of a board used for a controller in a HVDC system in accordance with one example embodiment of the present invention, and FIGS. 2 through 4 are detailed drawings, a signal connection diagram, and a table.

Below can be an explanation for an apparatus for setting up a board ID of a board used for a controller in a HVDC system in accordance with one example embodiment of the present invention by referring to FIGS. 1 through 4.

First of all, by referring to FIG. 1, the apparatus for setting up a board ID of a board used for a controller in a HVDC system in accordance with one example embodiment of the present invention comprises: IO boards 400 for controlling submodules, a main board 200 for managing at least one of the IO boards 400, and a backplane 100 for connecting the main board 200 with the at least one of the IO boards 400.

Herein, each of the IO boards 400 may create a board ID based on a location and a type of each of them mounted in the backplane 100, and deliver the board ID to the main board 200.

In addition, the apparatus for setting up a board ID of a board used in the controller in the HVDC system may further comprise a communication board 300 for performing communication with the at least one IO board 400, and a power supply board 500 for supplying power to the main board 200, the communication board 300 and the IO boards 400.

In other words, the IO boards 400 may be mounted in the backplane 100 together with the main board 200, the communication board 300 and the power supply board 500. Herein, the main board 200 should be capable of being operated by identifying locations and types of the communication board 300, the IO boards 400 and the power supply board 500 mounted in the backplane 100.

At the time, a type of a board may be set to be fixed according to a location of the board mounted, but this method may be ineffective depending on a method for expanding boards.

In addition, a type of a board may be identified through a unique ID of the each board regardless of its location, but it is impossible to identify a location of each of boards mounted. Upon inspecting a board, it is impossible to easily identify the location of such board.

Meanwhile, an apparatus for setting up a board ID of a board used for a controller in a HVDC system in accordance with one example embodiment of the present invention is easy to expand boards because a board ID is created based on locations and types of boards mounted. Besides, it is easy to inspect each board because the location of such board mounted is easily identified.

FIGS. 2 to 4 explain an apparatus of setting up a board ID in detail.

FIG. 2 is a drawing illustrating the front part of the backplane 100, in detail, where the main board 200, the communication board 300, IO boards 400 and the power supply board 500 are mounted as seen in FIG. 1.

As can be seen in FIG. 2, the IO boards 400 may be mounted in the backplane 100 regardless of types and order of the IO boards 400.

In other words, regardless of types of the IO boards 400, a first IO board 410, a second IO board 420, a third IO board 430, a fourth IO board 440, a fifth IO board 450 and a sixth IO board 460 may be mounted as such IO boards. When each of them is mounted in the backplane 100, the each of them may have its unique slot PIN value given by the backplane 100 and a unique board PIN value given to a type of each of the IO boards 400. Accordingly, when at least one of the IO boards 400 is mounted, the main board 200 may operate the one of the IO boards 400 properly according to a type of the one of the IO boards 400 by receiving a board ID created by the one of the IO boards 400.

FIG. 3 is a signal connection diagram representing a connection line through which each of the IO boards 400 creates a board ID in FIG. 1.

As can be seen in FIG. 3, a board ID may be created by the each of the IO boards 400 depending on a type and a location of the each of the IO boards 400 mounted in the backplane.

At the time, the IO board may create the board ID by reading a board PIN value that represents its type and a slot PIN value that represents its location mounted in the backplane.

In other words, slot information may be identified with a slot PIN value provided by the backplane 100. For example, if one of the IO boards 400 transmits High information to DI0 through DI3 and a return value of a switch set in the backplane 100 is returned as High as it is, it may be recognized as High, and if the return value is not returned, it may be recognized as Low. Accordingly, if DI0 is recognized as High and DI1 through DI3 are recognized as Low, slot information may be recognized as 0x1.

Similarly, board information may be found out with a board PIN value provided by one of the IO boards 400. After the one of the IO boards 400 transmits High information to DI4 through DI7, if DI4 is recognized as High and DI5 through DI7 are recognized as Low with a return value of a switch set in the one of the IO boards 400, board information may be recognized as 0x10.

After that, the board ID is created as 0X11 which is board information+slot information. In addition, the created board ID may be transmitted to the main board 200, and may be used for a communication frame between the one of the IO boards 400 and the main board 200.

Meanwhile, it is easy to inspect the IO boards 400 because it is easy to identify locations and types of the IO boards 400 upon debugging communication by utilizing such board IDs.

FIG. 4 is a table representing an example of each of JO boards creating a board ID in FIG. 1.

As can be seen in FIG. 4, the JO boards 400 may include at least one of an AI board, an AO board, an AI/AO board, a DI board, a DO board and a DI/DO board.

Herein, AI means Analog Input while AO refers to Analog Output. AI/AO represents Analog Input and Analog Output. DI, DO, and DI/DO mean Digital Input, Digital Output, and Digital Input/Digital Output, respectively.

At the time, each ID may be given depending on a type of a board. For example, 1, 2, 3, 4, 5 and 6 may be given to an AI board, an AO board, an AI/AO board, a DI board, a DO board and a DI/DO board, respectively.

Meanwhile, the number attached next to a type of a board may refer to the number of JO ports. For example, in case of AI16, it may also refer to providing 16 analog input ports.

If there are six slots mounted in the backplane 100, six slot PIN values may be given as slot information. For example, numbers one through six may be given.

Accordingly, it may be easily identified that if one of the IO boards 400 that provides 16 analog inputs is mounted to a second slot, 0x12 is given as a board ID. Therefore, it is possible to easily inspect IO boards 400 by utilizing such board IDs upon debugging communication because the locations and the types of the JO boards 400 can be easily identified.

Figure 5:
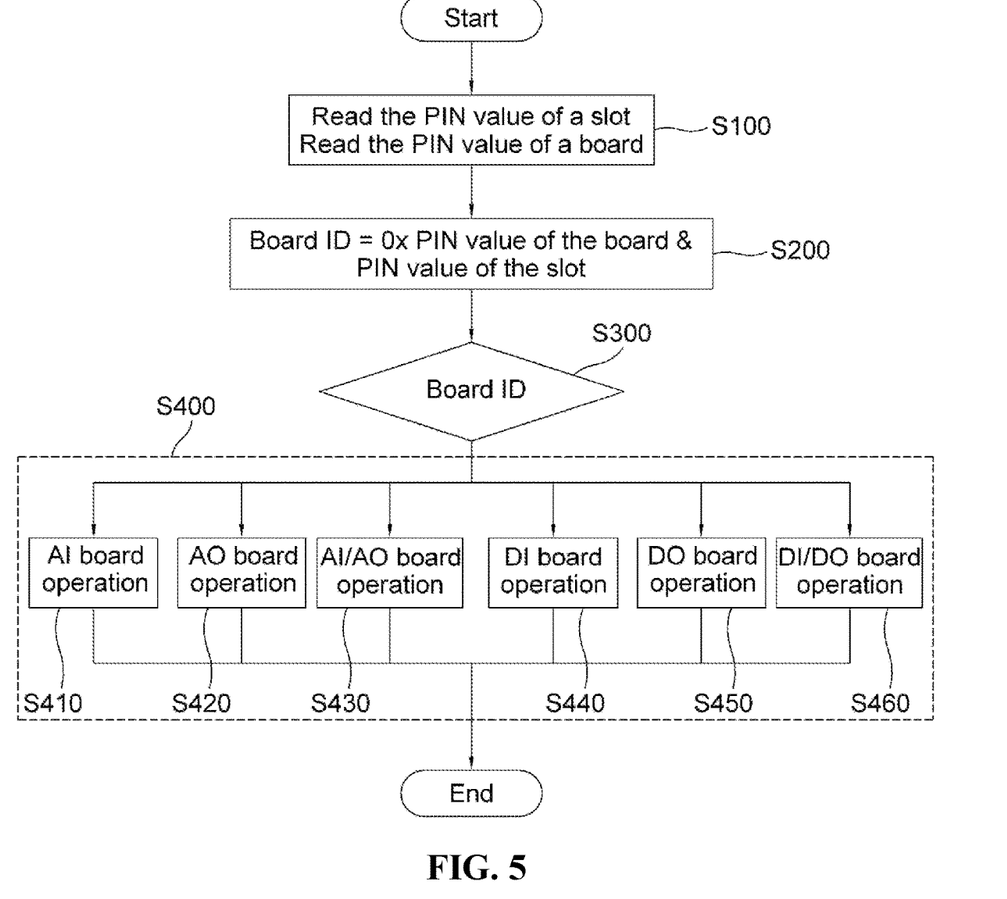
FIG. 5 is a flowchart illustrating a method for setting up a board ID of a board used for a controller in a HVDC system in accordance with one example embodiment of the present invention.

FIG. 5 is a flowchart illustrating a method for setting up a board ID of a board used for a controller in a HVDC system in accordance with one example embodiment of the present invention.

As can be shown in FIG. 5, a method for setting up a board ID of a board used for a controller in a HVDC system comprises: a step S100 of each of JO boards 400 reading a board PIN value representing its type and a slot PIN value representing its location mounted in a backplane 100; a step S200 of the each of the IO boards 400 creating a board ID based on the board PIN value and the slot PIN value; a step S300 of a main board 200 determining a type of the board and slot information with the board ID; and a step S400 of operating the board according to a result of determination with the board ID at the step S300.

Besides, the step S400 includes a step S410 of operating an AI board if the board ID represents the AI board; a step S420 of operating an AO board if the board ID represents the AO board; a step S430 of operating an AI/AO board if the board ID represents the AI/AO board; a step S440 of operating a DI board if the board ID represents the DI board; a step S450 of operating a DO board if the board ID represents the DO board; and a step S460 of operating a DI/DO board if the board ID represents the DI/DO board.

Herein, AI means Analog Input while AO refers to Analog Output. AI/AO represents Analog Input and Analog Output. DI, DO, and DI/DO mean Digital Input, Digital Output, and Digital Input/Digital Output, respectively.

At the time, each ID may be given depending on a type of a board. For example, 1, 2, 3, 4, 5 and 6 may be given to an AI board, an AO board, an AI/AO board, a DI board, a DO board and a DI/DO board, respectively. In addition, the number attached next to a type of a board may refer to the number of IO ports. For example, AI16 may be used to provide 16 analog inputs.

Meanwhile, if there are six slots mounted in the backplane 100, six slot PIN values may be given as slot information. For example, numbers one through six may be given.

Accordingly, it may be easily identified that if one of the IO boards 400 that provides 16 analog inputs is mounted to a second slot, 0x12 is given as a board ID. Therefore, it is possible to easily inspect IO boards 400 by utilizing such board IDs upon debugging communication because the locations and the types of the IO boards 400 can be easily identified.

As seen above, the apparatus and the method for setting up a board ID of a board used in the controller in the HVDC system has an advantage of being capable of easily identifying a location and a type of the board for inspection by setting up a board ID based on the location and the type of the board used for the controller in the HVDC system.

Example embodiments explained above include one or more example embodiments. Of course, it can be understood that all possible combinations of components or methods for the purpose of explaining aforementioned example embodiments can be described and a lot of additional combinations and substitutions of various example embodiments can be made by those skilled in the art. Accordingly, the explained example embodiments can include all alternatives, variations and alternations in the real intention and scope of what is claimed as attached.

INDUSTRIAL AVAILABILITY

The present invention is used for a controller in a HVDC system, and is available in the field of HVDC.

What is claimed is:

1. An apparatus for setting up a board identification (ID) of a board used for a controller in a high-voltage direct current (HVDC) system, comprising:
input/output (IO) boards for controlling submodules;
a main board for controlling the IO boards; and
a backplane for connecting the main board with the IO boards,
wherein each of the IO boards is configured to create the board ID by reading a board personal identification number (PIN) value that represents its type and a slot PIN value that represents its location mounted in the backplane, and to deliver the board ID to the main board,
wherein the board ID includes board information and slot information, and the board ID is used for a communication frame between the each of the IO boards and the main board,
wherein the slot information is identified with the slot PIN value provided by the backplane,
wherein the slot information is recognized as high if the each of the IO boards transmits the high information to a switch set in the backplane and a return value of the switch set in the backplane is returned as high as it is, and the slot information is recognized as low if the return value of the switch set in the backplane is not returned, wherein the board information is recognized with the board PIN value provided by the each of the IO boards, and wherein the board information is recognized as high if the each of the IO boards transmits the high information to a switch set in the each of the IO boards and a return value of the switch set in the each of the IO boards is returned as high as it is, and the board information is recognized as low if the return value of the switch set in the each of the IO boards is not returned.

2. The apparatus of claim 1, further comprising:
a communication board for performing communication with the each of the IO boards; and
a power supply board for supplying power to the main board, the communication board and the each of the IO boards.

3. The apparatus of claim 1, wherein the each of the IO boards is mounted in the backplane, regardless of its type and order.

4. The apparatus of claim 1, wherein the IO boards include at least one of an analog input (AI) board, an analog output (AO) board, an analog input/analog output (AI/AO) board, a digital input (DI) board, a digital output (DO) board and a digital input/digital output (DI/DO) board.

5. A method for setting up a board identification (ID) of a board used for a controller in a high-voltage direct current (HVDC) system, comprising steps of:
collecting, using one of input/output (IO) boards, board personal identification number (PIN) information and slot PIN information by reading a board PIN value that represents its type and a slot PIN value that represents its location mounted in a backplane;
creating, using the one IO board, the board ID based on the board PIN value and the slot PIN value;
determining, using a main board, a type of the one IO board and slot location with the board ID; and
operating the one IO board according to a result of determination with the board ID, wherein the board ID is created as board information and slot information, and the board ID is used for a communication frame between the one IO board and the main board, wherein the slot information is identified with the slot PIN value provided by the backplane, wherein the slot information is recognized as high if the one IO board transmits the high information to a switch set in the backplane and a return value of the switch set in the backplane is returned as high as it is, and the slot information is recognized as low if the return value of the switch set in the backplane is not returned, wherein the board information is recognized with the board PIN value provided by the one IO board, and wherein the board information is recognized as high if the one IO board transmits the high information to a switch set in the one IO board and a return value of the switch set in the one IO board is returned as high as it is, and the board information is recognized as low if the return value of the switch set in the one IO board is not returned.

6. The method of claim 5, wherein the step of operating the IO boards includes steps of:
operating an analog input (AI) board if the board ID represents the AI board;
operating an analog output (AO) board if the board ID represents the AO board;
operating an analog input/analog output (AI/AO) board if the board ID represents the AI/AO board;
operating a digital input (DI) board if the board ID represents the DI board;
operating a digital output (DO) board if the board ID represents the DO board; and
operating a digital input/digital output (DI/DO) board if the board ID represents the DI/DO board.

\* \* \* \* \*